United States Patent [19]

Risser et al.

[11] 4,158,469

[45] Jun. 19, 1979

[54] FEED MATERIAL HANDLING APPARATUS

[75] Inventors: Roger L. Risser; Arthur L. Kelsey, both of Leola; Thomas L. Stiefvater, New Holland, all of Pa.

[73] Assignee: Sperry Rand Corporation, New Holland, Pa.

[21] Appl. No.: 826,377

[22] Filed: Aug. 22, 1977

[51] Int. Cl.$^2$ ............................................. B65G 53/40
[52] U.S. Cl. ......................................... 406/89; 406/98
[58] Field of Search ..................... 302/4, 8, 29, 35, 37, 302/38, 42, 45, 47, 51

[56] References Cited

U.S. PATENT DOCUMENTS

| 954,944 | 4/1910 | Dunn | 302/47 |
|---|---|---|---|
| 1,900,213 | 3/1933 | Wenberg | 302/37 |
| 3,466,095 | 9/1969 | Weihmuller | 302/37 |
| 3,968,997 | 7/1976 | Mast et al. | 302/37 |

Primary Examiner—Robert B. Reeves
Assistant Examiner—James L. Rowland
Attorney, Agent, or Firm—C. Hercus Just; Frank A. Seemar; John B. Mitchell

[57] ABSTRACT

The feed material handling apparatus has a frame supporting a feed-receiving hopper disposed horizontally on said frame and an impeller rotatable about a vertical axis therein impels said material through a discharge tunnel to a substantially vertical blower having an impeller operable about a horizontal axis which urges the material up a vertical transition member into a silo or the like. The hopper adjacent said tunnel is partially covered and provided with air inlet openings, while the sidewalls of said blower are imperforate except for a material inlet opening from said tunnel and openings for a shaft for said impeller of said blower. A metering blade also is mounted adjacent the inlet to said tunnel to control the flow of material to said tunnel.

1 Claim, 3 Drawing Figures

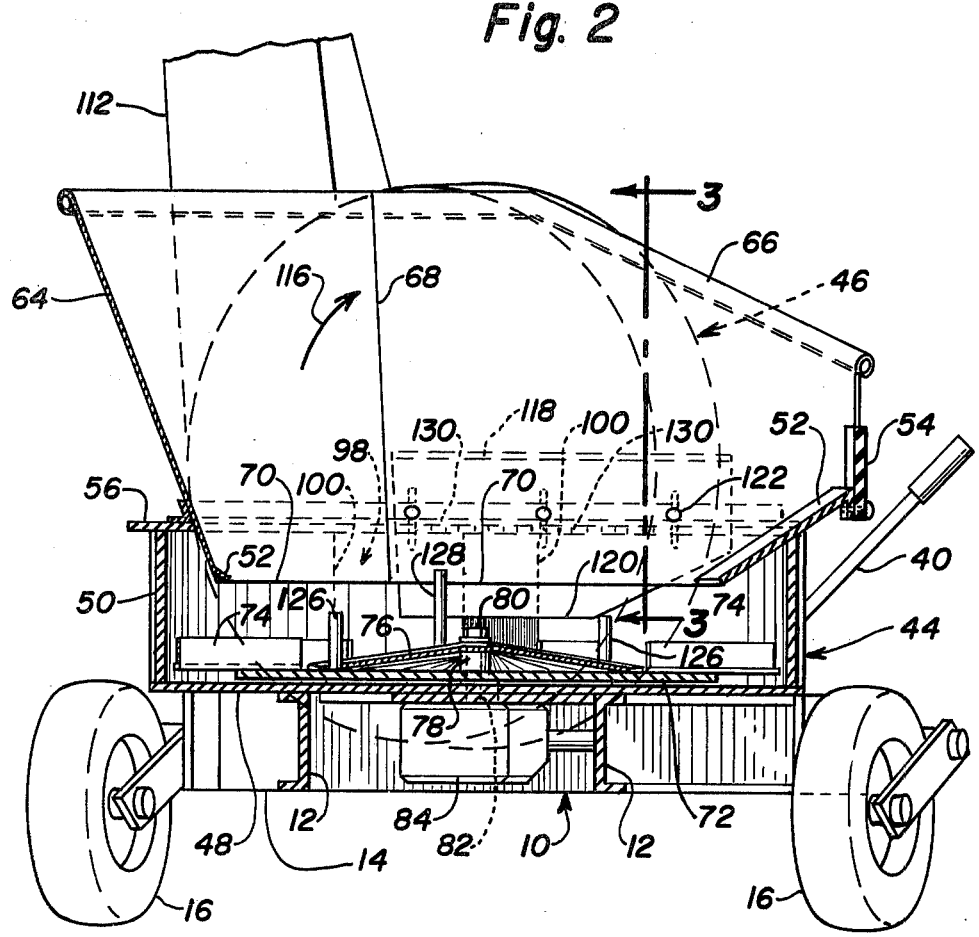
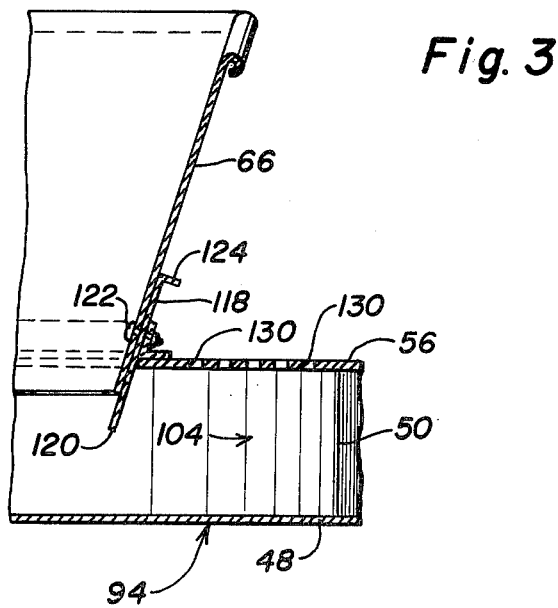

FEED MATERIAL HANDLING APPARATUS

BACKGROUND OF THE INVENTION

To a large extent, the present invention comprises an improvement over the assignee's prior U.S. Pat. No. 3,968,997, dated July 13, 1976, in the names of A. D. Mast and J. P. Lyet, II., the assignee being Sperry Rand Corporation of New Holland, Pa.

This invention is directed particularly to the delivery of feed material, such as forage crops and the like which are harvested in the field in comminuted form and are discharged into forage wagons which haul the material to a material handling apparatus such as those disclosed in the aforementioned prior patent, as well as the following additional prior patents:

| | | |
|---|---|---|
| 2,405,695 | Hitchcock et al | August 13, 1946 |
| 2,488,626 | Hansen | November 22, 1949 |
| 3,671,077 | Hoyt et al | June 20, 1972 |
| 3,724,908 | Burrough et al | April 3, 1973 |

All of the aforementioned patents employ substantially vertically arranged blowers having spaced sidewalls, one of the walls having an inlet opening to receive the material and the impeller of the blower discharges the material tangentially and usually in a vertical direction to a transition member such as a vertical conduit which extends to the inlet opening of a silo or the like, usually near the top thereof.

Silos of very substantial heights are popular at present and in view of the fact that the crop material must be impelled upwardly through the transition member to the discharge end thereof, it is obvious that the blower, especially the equipment associated therewith which delivers the material to the blower, must operate at maximum efficiency.

Referring to the four (4) patents listed immediately above, it will be noted that one of the vertical walls of the blower in at least the patents to Hitchcock et al, Hansen and Burrough et al have air inlet openings formed therein for the intended purpose of facilitating the force with which the material is discharged vertically from the blower. However, especially when the blower is associated with the material handling apparatus which includes an impeller mounted for movement about a vertical axis adjacent the inlet of the blower and communicating therewith with some type of chute or tunnel, the provision of the air inlet openings in said sidewall of the blower results in the material tending to accumulate in such chute or tunnel between the material handling means and the blower. It is reasoned that the introduction of air to the sidewall of the blower reduces the suction produced by the blower upon the chute or tunnel referred to but, for whatever the actual reason may be, it has been proven in operating devices that such accumulation of the material exists in the region of the chute or tunnel between the handling apparatus and the blower.

The prior patents to Hoyt et al and Burrough et al show horizontal material handling apparatus which employ impellers to discharge material dumped into the receptacle within which the impeller operates, but the upper portion of the receptacle or hopper essentially is entirely open and there is no well defined enclosed passage means, such as a tunnel, between the material handling apparatus and the vertical blower. The assignee's prior U.S. Pat. No. 3,968,997, referred to above, was developed in an effort to effect more efficient transfer of material from the handling apparatus to the vertical blower, and this is accomplished by an enclosed, tangential tunnel, which extends between the sidewall of the hopper of the handling apparatus and the inlet in one sidewall of the vertical blower. In one embodiment of said invention, the major portion of the top of the hopper of assignee's prior patent, is open, while in the second embodiment, it is partially covered and the cover is connected to the upper wall of the tunnel between the handling apparatus and the vertical blower. It has been found that in the operation of handling apparatus of this type, effective movement of the material through the tunnel is not as efficient as is desired under conditions where the entire hopper top opening is covered by incoming material. Therefore, in addition to increasing the capability of the material moving through said tunnel, it is a major objective of the present invention to increase the capacity and speed of the handling apparatus to maximize the passage of material through the tunnel, especially by rendering it airborne by improvements offered by the present invention, details of which are set forth below.

SUMMARY OF THE INVENTION

It is one of the major objectives of the present invention to increase the speed of operation of a material handling apparatus which includes a substantially horizontal rotary feed table embodying an impeller operable about a vertical axis within a hopper relative to feeding forage crop material to a substantially tangential closed tunnel which communicates with an inlet opening in one vertical sidewall of a blower and the top wall of said tunnel being coextensive with a cover which partially overlies the otherwise open top of said hopper and said top of said tunnel and an adjacent portion of said cover being provided with air inlet openings which introduce air to the material as it is being impelled during discharge tangentially from the handling apparatus into said tunnel, the air also being drawn into said openings by the suction imparted upon the discharge end of the tunnel by the vertical blower, whereby substantially all of the material passing through the tunnel becomes airborne as it is introduced to the inlet of the vertical blower, whereby there is no tendency for any of the material to accumulate within the tunnel, as has been the experience in the use of certain prior devices.

It is another primary object of the invention to utilize substantially vertical baffle means extending upward from the inner edge of the partial cover for the hopper, which edge, incidentally, is spaced from the central axis of the hopper, and said baffle means support a vertically adjustable blade, the lower portion of which extends below the plane of the upper edge of said hopper is operable adjacent the inlet of the tunnel to meter the delivery of comminuted material to the tunnel for the same being rendered airborne therein, the impeller of said handling apparatus being particularly effective to disintegrate and comminute any clumps or lumps of material which are discharged from a forage wagon into the apparatus.

It is a further object of the invention to provide completely imperforate sidewalls on the vertical blower except for the inlet opening thereto from the tunnel and openings in the walls through which the shaft of the impeller of the blower extends.

BRIEF DESCRIPTION OF THE DRAWINGS

FIG. 2 is a vertical sectional view of the material handling apparatus shown in FIG. 1, as seen on the line 2—2 of said figure.

FIG. 3 is a fragmentary vertical sectional view of a portion of the material handling apparatus, as seen on the line 3—3 of FIG. 2.

DETAILED DESCRIPTION

Figure 1:
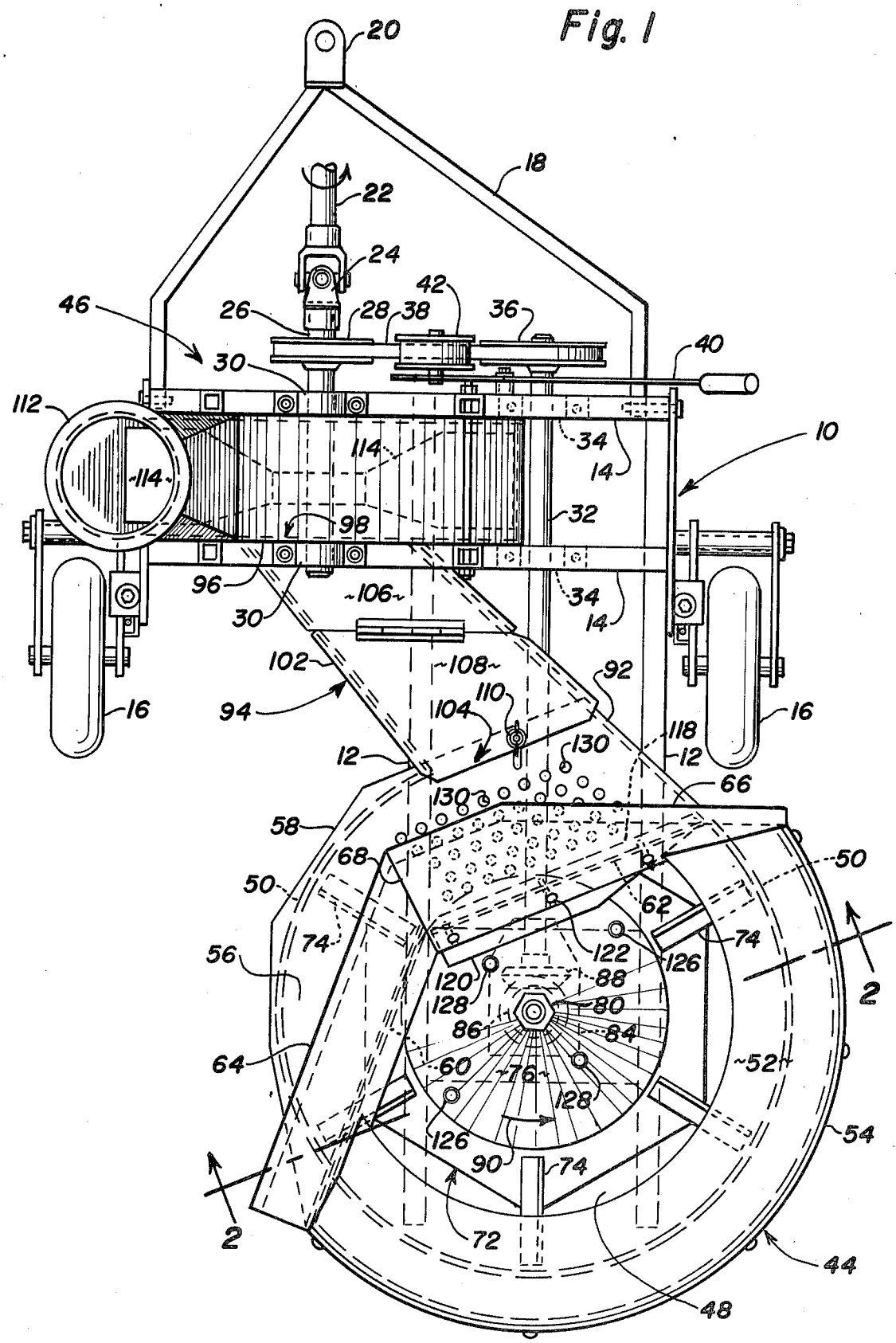
FIG. 1 is a top plan view of the preferred embodiment of the feed material handling apparatus embodying the principles of the present invention.

Referring to FIGS. 1 and 2, the overall feed material handling apparatus embodying the present invention comprises a mobile frame 10 which includes a pair of elongated side members 12 and several parallel cross members 14. The frame yieldably supports a pair of wheels 16 and the forward end of the frame has a tongue arrangement 18 which, on the leading end has a clevis 20 by which the frame is connected to a tractor unit, not shown. Preferably the tractor is of the type which has a p.t.o. to which a drive shaft 22 of the apparatus is connected by conventional means.

Drive shaft 22 actuates a universal joint 24 which is connected to the forward end of a shaft 26 and upon which a drive pulley 28 is mounted, said shaft being supported by a pair of bearings 30 attached to frame members 14. Said frame also supports an additional longitudinal shaft 32, which extends through bearings 34 respectively carried by the frame members 14 and the forward end of shaft 32 has a driven pulley 36 connected thereto. Drive belt 38 extends around pulleys 28 and 36 and a pivoted lever 40, which is manually operable, has a tightening pulley 42 mounted on one end thereof, whereby when the lever 40 is manually moved in one direction, it will bring the pulley 42 to bear against the drive belt 38 and thereby clutch the pulley 36 and shaft 32 to the drive pulley 28 for operation of the shaft 32 simultaneously with the shaft 26, for purposes to be described.

The overall material handling apparatus basically includes two principal units. One of these is the horizontal rotary feed table 44 and the vertical blower 46 is the other. Rotary feed table 44 comprises a bottom plate 48 which is circular and connected to the perimeter thereof is a vertical cylindrical sidewall 50 which is shown in phantom in FIG. 1 and sectional view in FIG. 2. A segment of a frusto-conical material guide member 52 of appreciable radial width extends for a substantial part of its inner rim into the hopper formed by sidewall 50 and bottom plate 48 and the outer rim portion thereof extends away from and above the upper edge of the sidewall 50, as shown clearly in FIG. 2. The segmental extent of the sidewall 50 as best shown in FIG. 1, and the outer peripheral edge of the guide member 52 supports a segmental vertical retaining wall 54, which is formed of durable, flexible material, such as heavy duty rubber, reinforced, or otherwise, the lower edge of the wall being secured by rivets or otherwise to a depending flange on the outer peripheral edge of the guide member 52, as best shown in FIG. 2. The wall 54 is coextensive in length with the guide member 52.

The top of the hopper defined by the sidewall 50 is partially covered by a cover 56 which extends across the open top of said hopper, the outer edge 58 thereof extends a limited distance beyond the sidewall 50, as shown in FIG. 1, while the inner edge thereof is defined by a pair of straight edges 60 and 62, which subtend an obtuse angle, as clearly shown in FIG. 1. Extending upward from the inner edges 60 and 62, respectively, of the cover 56 are a pair of associated bank boards or baffles 64 and 66, the adjacent edges of which are connected along the line 68. The lower edges 70 of the baffles 64 and 66 extend a short distance into the interior of the hopper defined by sidewall 50, as is clearly shown in FIG. 2.

The arrangement shown thus far with respect to horizontal feed table 44 is for purposes of providing practical means to receive harvested crop material of a forage nature or otherwise which is unloaded from a forage or farm wagon into the hopper, and as can be best visualized from FIG. 1, substantially half of the circumference of the hopper of the handling apparatus is available to receive the material so that it is not necessary to be extremely precise in positioning the wagon relative to the hopper. Also, the flexibility of the retaining wall 54 enables the same to sustain a reasonable amount of relatively rough handling without damage.

A rotary impeller 72, which, as illustrated in FIG. 1, is specifically in the form of a hexagonal plate, supports at the angular corners thereof, a plurality of impeller blades 74, which are of an angular nature and have vertically extending flanges, the exemplary height of which is best shown in FIG. 2. The upper edges of said vertical flanges are amply spaced below the lower edges 70 of the baffles 64 and 66 and the central portion of the rotary impeller plate is surmounted by a supplemental circular plate 76 which, as best shown in FIG. 2 in vertical section, comprises a flat cone and a spacing sleeve 78 extends between the flat impeller plate and the apex of the supplemental plate 76, as clearly shown in FIG. 2. A suitable bolt 80 clamps the plate 76 and flat impeller plate 72 against the upper end of a short vertical drive shaft 82 which extends upward from gear housing 84. Gear housing 84 encloses a pair of meshing bevel gears 86 and 88, respectively connected to drive shaft 82 and the inner end of longitudinal shaft 32 for purposes of rotating the impeller 72 counterclockwise, as indicated by the directional arrow 90, when viewed in plan view, as shown in FIG. 1.

For purposes of moving deposited crop material from the hopper defined by sidewall 50 to the inlet of the vertical blower 46, the sidewall 50 is provided with a tangential discharge port, one side of which is defined by the vertical wall 92, shown in FIG. 1, the outermost portion of which defines one side of a tangentially directed discharge tunnel 94, which extends between said hopper and the inlet of the vertical blower 46.

The vertical wall 96 of the housing of vertical blower 46 is provided with an inlet opening 98 defined by the vertical dotted lines 100, shown in FIG. 2. The vertical dimension of said opening is defined by the cover plate 56 at the top and the bottom plate 48 of the hopper of the feed table 44. The discharge end of the tunnel 94 which is directly in communication with the opening 98 is of the same dimension in cross-section and, otherwise, especially for purposes of simplifying the manufacture thereof, the tunnel 94, in cross section, is substantially rectangular. As indicated above, one sidewall of the discharge tunnel 94 comprises wall 92 and the opposite sidewall 102 extends substantially at a right angle to the adjacent portion of the sidewall 50 of the hopper which substantially defines one side of the tangential discharge opening 104. The top 106 is substantially in the same plane as the cover 56 and is coextensive therewith adjacent the discharge opening 104.

For purposes of servicing the discharge tunnel 94, the top 106 thereof, also preferably includes a hinged cover 108, which is secured by a suitable wing nut 110, or otherwise.

The vertical blower 46 has a tangential uptake type of discharge 112, the upper end of which, not shown, communicates with a vertical or other position of transition member, such as a vertical loading conduit usually provided on the exterior wall of a silo or otherwise. Mounted upon the shaft 26, which extends through the sidewalls of vertical blower 46 is a series of conventional blower impellers 114, best shown in FIG. 1, these being of conventional construction. In accordance with the principles of the present invention, the impeller in the blower 46 rotates clockwise as viewed, facing forward of the apparatus, as indicated by the directional arrow 116 in FIG. 2. This arrangement is preferred in relation to the direction of rotation of the impeller 72 of the horizontal feed table 44, and thereby, provides a natural continuation of movement of the material as discharged from the tunnel 94 through the inlet opening 96 of the vertical blower, whereby no abrupt acute angular changes of the path of movement of the material are required.

An important feature of the present invention resides in the fact that except for the inlet opening 98, the uptake discharge 112 and the openings necessarily provided in the spaced parallel vertical side plates of the blower 46 through which the shaft 26 extends and with which said openings are complementary, the remainder of the housing of the blower 46, including said side plates thereof, are imperforate.

OPERATION OF THE APPARATUS

As forage crop material is progressively unloaded into the upper receiving opening of the hopper defined by sidewalls 50, the impeller in the hopper is rotated counterclockwise, as shown by the arrow 90, as driven by the drive shaft 32 through the medium of the bevel gears 86 and 88, which rotates the impeller blades 74 in a manner to continuously disintegrate the material and move the same toward the discharge opening 104, which, additionally, is the inlet opening of the discharge tunnel 94. In order to regulate the delivery of said material to the tunnel 94, a metering blade 118 is supported by the baffle 66, as best shown in FIG. 3, in sectional view, and the lower edge 120 thereof extends into the tangential discharge opening 104 to control the volume of the material discharged into the tunnel 94. As can be seen from FIG. 3, the metering blade 118 is provided with a series of slots perpendicular to the lower edge 120 and through which clamping bolts 122 extend to secure the lower edge in the desired position within the tunnel 94. Adjustment is also facilitated by the manually engageable flange 124, shown in FIG. 3.

The lower edge 120 of the metering blade 118 also cooperates with a plurality of upstanding agitating pins 126, which are spaced radially from the vertical axis of the impeller 72 a greater distance than a pair of vertically longer agitating pins 128, the radial distance of the pins 128 from the axis of the impeller 72 being such that said longer pins extend above the lower edge 120 of metering blade 118 but do not interfere therewith, whereas the upper ends of pins 126 pass beneath said lower end of the metering blade, as can be visualized from FIG. 2.

THE PRINCIPAL IMPROVEMENT

The greater extent and particularly the shape of the inner edges of the cover 56 of the present invention as compared with that in the assignee's prior U.S. Pat. No. 3,968,997, particularly the manner in which the same comprises a continuation of the top 106 of tunnel 94, which includes cover 108, provides means within which a plurality of air inlet openings 130 are formed, the preferred pattern and extent of which is best shown in FIG. 1 in exemplary manner. The function of said openings is to permit the intake of sufficient air to the interior of the discharge tunnel 94 by means of the suction generated by the blower 46, so that the disintegrated forage material passing through tunnel 94 becomes airborne incident to being delivered to the vertical blower 46. The mechanism otherwise described above by which the disintegration of the material is achieved, insures that by the time the material reaches the tunnel 94, no appreciable conglomerations, clumps, or other masses of undisintegrated material occur in said tunnel. The operative position of the metering blade 118 also is adjusted to contribute to such result. The inlet of the air to render the material airborne also very importantly is facilitated by the fact that the opposite sidewalls and other portions of the housing of the blower 46 are imperforate, except for the necessary openings which include the inlet 98, uptake discharge 112 and the complementary openings through which the shaft 26 extends. Rendering the material airborne in the discharge tunnel 94 greatly increases the capacity and speed of operation of the entire material handling apparatus and, therefore, maximizes the amount of material which can be handled by the apparatus in comparison with previous types of crop material handling apparatuses, coupled with the improved capabilities of disintegrating the material and insuring that the same is rendered readily capable of becoming airborne in the discharge tunnel 94. The bank board type baffles 64 and 66 also permit the discharge of material from a forage wagon at a substantial range of angles, thereby, affording more unloading flexibility.

Further, in accordance with the preferred principles of the operation of the apparatus of the present invention, the speed of the impeller of the vertical blower 46 is materially greater than that of the impeller of the feed table. For illustrative purposes and without restriction thereto, one specific example of dimension and speed rate comprises the blower impeller rotates at substantially 1000 rpm, whereas the impeller of the feed table operates at approximately 220 rpm. Further, the diameter of the vertical blower 46 is approximately 32 inches, and that of the feed table is approximately 42 inches. From this, it can readily be visualized that tremendous suction is developed by the vertical blower at the intake end thereof, especially to insure the movement of the airborne material through the discharge tunnel 94, and also provide highly adequate blowing potential at uptake discharge 112 of the blower to insure the movement of the material upwardly through a vertical transition member, for example, of substantial dimension in order to deliver the same to the opening at the upper end of a silo or the like.

From the foregoing, it will be seen that the feature of rendering the forage material airborne through the tunnel is one of the most essential features of the present invention, and as the material leaves the outer ends of the impeller of the feed table tangentially, the introduction of air at the point of the material entering the tunnel, insures that the material is rendered airborne and further, results in the particles of the material being separated at the outlet of the tunnel as introduced into the inlet of the vertical blower.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. In a forage blower system for receiving crop material from a forage wagon and for directing the same in at least partially airborne manner to a blower which blows and throws the airborne material upwardly through a transition member to a silo or the like, said system comprising:
   (a) a frame,
   (b) a substantially horizontal rotary feed table including a substantially horizontal bottom and a substantially vertical sidewall having a discharge opening therein connected to said bottom to provide a hopper on said frame having a horizontal top,
   (c) a rotary impeller supported within said hopper for rotation about a substantially vertical axis and including radial impeller blades spaced a limited distance at the tips from the sidewall of said hopper and operable to engage said crop material,
   (d) a discharge tunnel extending substantially tangentially and horizontally from said discharge opening in said sidewall of said hopper and having a top plate,
   (e) a blower having a housing supported by said frame and provided with substantially vertical sidewalls parallel to each other and an impeller therein rotatable about a substantially horizontal axis, one of said sidewalls having an inlet opening communicating with the discharge end of said tunnel to receive crop material therefrom and said housing having a tangential transition discharge member communicating with a port in said housing, and
   (f) drive means for said impellers of said feed table and blower and operable to drive the impeller of said blower at a substantially greater speed than the impeller of said feed table;

the improvement comprising:
   (g) a horizontal cover member extending across the top of said hopper from one edge of said top plate of said tunnel to a portion of the sidewall less than half the circumference of said sidewall and the inner edge of said cover member being spaced from the axis of said hopper, and
   (h) a plurality of permanently open air inlet vent holes in said horizontal cover member at least in the portion thereof nearest the inlet end of said tunnel and extending over an area substantially as wide as said tunnel and operable to introduce air constantly to said tunnel and thereby render the disintegrated forage material airborne as it passes via said tunnel into said blower.

* * * * *